United States Patent [19]

Ingemann

[11] 4,332,332
[45] Jun. 1, 1982

[54] CONTAINER AND CLOSURE HAVING FRANGIBLE OPENING MEANS

[75] Inventor: Ole Ingemann, Svendborg, Denmark

[73] Assignee: A/S Haustrup Plastic, Langeskov, Denmark

[21] Appl. No.: 210,896

[22] Filed: Nov. 28, 1980

[30] Foreign Application Priority Data

Dec. 17, 1979 [SE] Sweden .............................. 7910362

[51] Int. Cl.³ .......................................... B65D 17/40
[52] U.S. Cl. ................................. 220/276; 220/266; 220/270; 220/359
[58] Field of Search .............. 220/266, 270, 276, 359, 220/307

[56] References Cited

U.S. PATENT DOCUMENTS

| | | | |
|---|---|---|---|
| 3,981,412 | 9/1976 | Asmus | 220/270 |
| 4,006,839 | 2/1977 | Thiel et al. | 220/266 |
| 4,113,136 | 9/1978 | Allott | 220/276 |
| 4,207,989 | 6/1980 | Ingemann | 220/359 |
| 4,212,409 | 7/1980 | Jeppsson | 220/276 |
| 4,215,797 | 8/1980 | Chen | 220/359 |

*Primary Examiner*—George T. Hall

*Attorney, Agent, or Firm*—Hane, Roberts, Spiecens & Cohen

[57] ABSTRACT

A container (4) has a closure (15) which consists of a fastener (6) and a lid (1) which are joined together all the way round by a failure zone (2). When the container is originally sealed the closure is inserted into the opening and the fastener is fixed to a flanged top surface (5) which surrounds the opening. The failure zone is located at the point at which the internal surface (3) of the opening meets the top surface of the opening. The lid is dished inwards within the failure zone in such a way that the outer edge of the dishing (7) forms a guide (10) against the internal surface (3). A surface (8) of the lid running parallel with the top surface is connected to the guide (10). The lid is broken open and is torn along the length of the failure zone by a locally applied force. The application of force inwards will as a rule move the lid over the distance a until the surface (8) makes contact with a ledge (11) located inside the container (4). The surface (8) supporting the material of the lid thus forces the guide (10) against the wall of the container and holds the lid in a sealing position inside the opening. The lid adopts a similar position in a re-sealed container. Gripping devices, preferably in the form of stiffening ribs, make it easier to remove the lid from the position just mentioned.

8 Claims, 18 Drawing Figures

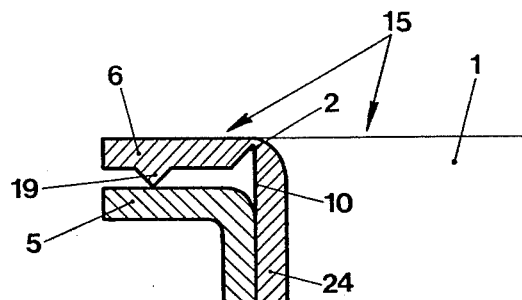
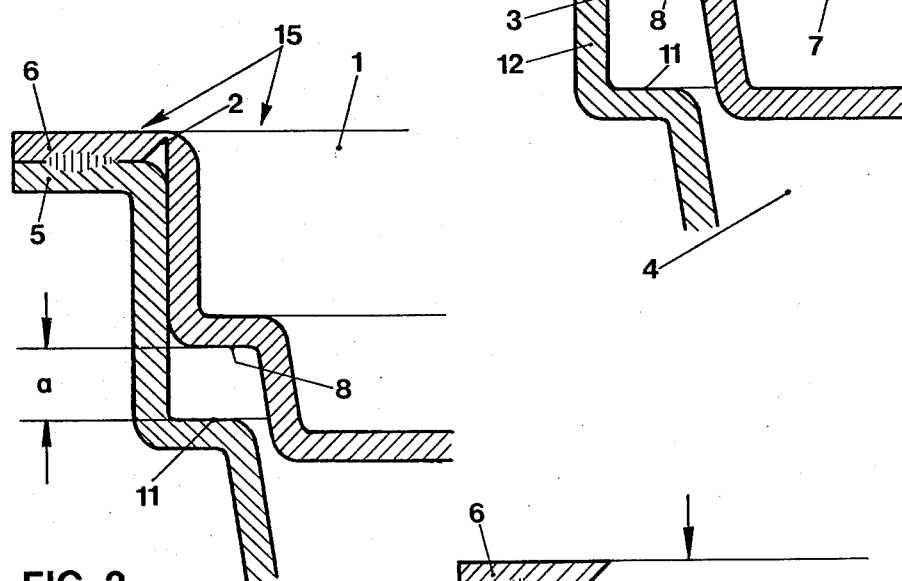
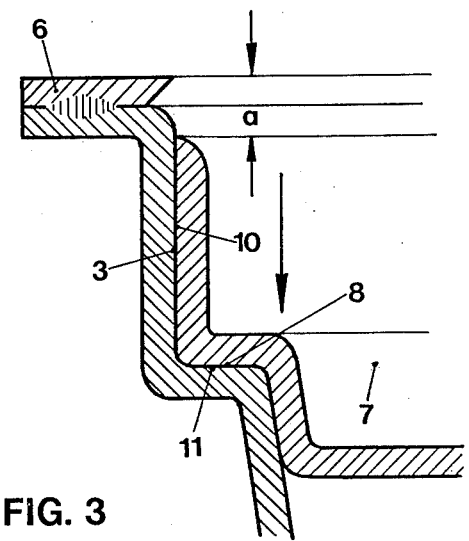

CONTAINER AND CLOSURE HAVING FRANGIBLE OPENING MEANS

FIELD OF THE INVENTION

The present invention relates to a container with an opening facing upwards in the top surface, said container being provided with a closure for the opening, said closure consisting of a fastener and a lid which are joined together all the way round by means of a failure zone, said closure being inserted into the opening and forming a seal with the container. By means of a locally applied force, which should preferably be in the form of a compressive force, the lid may be torn open along the failure zone and may be caused to move inwards by means of a force directed towards the inside of the container to a point at which, having moved over the distance a, the lid will on the one hand make contact with a surface running parallel with the top surface, and will on the other hand take up a position which will make any further opening difficult. The lid has a gripping device for the removal of the lid from the position just mentioned when opening the container.

BACKGROUND

We are already familiar with a closure for a container of the type indicated above from U.S. Pat. No. 3,998,354. This familiar closure has certain disadvantages and is also not suitable for use with containers which are manufactured and filled in large numbers for the following reasons:

1. The internal width of the mouth of the container is greatly restricted by the fastener of the closure. The removal of the contents is made much more difficult, particularly where the diameter of the mouth is small.
2. Although admittedly the familiar closure is individually formed by an injection moulding process, it does have a complicated shape. Its manufacture is consequently expensive and relatively time-consuming. From the mechanical point of view this closure is best suited for use with small openings in metal containers. The attachment to the body of the container is unreliable where the container mouth is large, with the associated risk that the closure will be several times more expensive than the actual body of the container.
3. The familiar closure is not stackable. It is not capable of being handled in a practical manner during transport or storage. Nor is it possible to feed such closures in a practical manner to a device for closing the container.
4. The familiar gripping device is not located in a practical manner, since it extends over the failure zone. Just like the hinge, this prevents the use of welding or similar fastening methods.
5. The use of the edge of the failure zone in the lid for snapping-in in combination with compression is unsatisfactory as a function, since the edge of the failure zone will vary from one container to another. Dirt may also collect between the edge of the failure zone and the supporting flange. No reference is made in the patent specification to trouble-free snapping-in.
6. There are two areas in the closure where sealing may be poor, one of these being where the closure is introduced into the opening, and the other between the fastener and the lid after it has been separated from the failure zone. Poor sealing is likely to be greater at the first point than at the second.
7. There is a risk of the fastener part of the closure falling from the mouth of the container as it is opened, especially in the case of large openings.
8. In the case of both injection moulded and blow moulded containers it is difficult to achieve a satisfactory fit between the container and the closure. Only special plastics materials, e.g. polyethylene, exhibit sufficient elasticity to be capable of snapping-in in the manner shown in FIG. 4. Where the internal pressure is the same, the wall strength of the container must be high irrespective of whether it is made of metal or of a plastic material. The body of the container must always possess sufficient strength to allow the necessary reduction to take place in the dimensions of the fastener when it is attached to the container.
9. An elastic plastics material such as polyethylene can easily be the cause of poor sealing, since such plastics materials change with time because they always flow a little.

SUMMARY OF THE INVENTION

Thus the aim of the present invention is to produce a container with a closure of the type indicated in the introduction in which the indicated disadvantages are avoided and which is able to satisfy the requirements of large-scale production. The container and the closure are also designed to fit together in such a way as to be stackable both individually and when full, besides which they are capable of being manufactured at a reasonable price. Furthermore, they are easily assembled and provide a good seal.

This problem is solved by positioning the failure zone in the lid at the point at which the internal surface of the mouth of the container meets the actual top surface, whereby a flange located on the container is bonded to the fastener part of the closure, preferably by ultrasonic welding, and by causing the lid within the failure zone on the one hand to support the gripping device with which the container is opened on the outside, and on the other hand to be so dished inwards that the dishing forms a guide against the internal surface of the mouth, whereby a surface running parallel with the top surface is connected to the guide, said surface after the lid has been torn open and if applicable after the lid has moved inwards over the distance a making contact with a ledge located inside the container and forcing the guide against the wall of the container.

These characteristic features of the nature of the invention combine to produce the advantage that the opening which receives the contents is particularly wide and is in no way obstructed by ledges or flanges which constrict the opening. The contents are unable to contaminate corners difficult of access, and there is no difficulty in seeing the contents once the lid has been removed. The mating surfaces which hold the lid in place and which provide it with sealing and support are positioned so close to each other and are designed to within such precise limits that the snapping into place of the lid cannot be prevented by the mouth being heavily contaminated with the contents. The connection between the container and the closure is also found at the outermost circumference of the top surface, which makes it freely accessible to welding apparatus. It is true that a similar welded arrangement is also described in German Pat. No. 2 533 631. One disadvantage of this solution, however, is that the weld must be interrupted to obtain loosening of the lid in the area of the gripping device when the container is opened. The interruption is made between the edge of the container and the failure zone in an area where a gripping device is extending outwardly and arranged for pulling. However, it is not possible to make this weld by means of a different welding process so that it will be weaker, since no alternative welding process does in fact exist. The situation will arise in which either the container is not properly sealed by the weld or the gripping device becomes detached because of a weld which provides a good seal but which is also far too strong. Or else attempts to open the container will produce a split in that part of the lid which is intended to be used for re-sealing. A further disadvantage is that the failure zone does not run around the mouth without interruption, but extends to the outer edge in the area of the gripping device. It is also situated outside the actual edge of the mouth so that the lid which is intended to be torn off is larger than the mouth. This means that the container may not be opened by the application of external pressure to a central part of the closure causing it to move inwards into the container in the direction of the axis of the container. Feeding the lid into a welding apparatus calls for care in its angular positioning with regard to the gripping device and the two dissimilar attachment zones, asked for.

In another embodiment of the present invention where the opening is cylindrical provision is made for a number of radial stiffening ribs which are uniformly distributed around the circumference to be located between the central parts of the top of the lid and an annular failure zone. The stiffening ribs are so designed as to serve both as a gripping device for opening the lid and as a stacking device for a pile of filled containers or of loose closures. This measure provides considerable stiffening of the loose lids which are to be used for re-sealing.

The lids seal better in this way and are stronger. The uniform distribution of the stiffening ribs around the circumference has the advantage that the pressing down of the failure zone no longer has to start at a particular point on the circumference, but may be started at any one of these gripping devices. The same applies to the choice of gripping device on subsequent opening of the container, where it is no longer necessary for the container to be turned.

A further provision is that one individual gripping device chosen at random and adjacent to, for instance, a gripping surface which has been made rough by means of ribbing, bears operating instructions which consist, for example, of the text "1. PRESS" for starting to open the failure zone and "2. PULL" for continuing the opening process in conjunction with the initial opening of the container and on any subsequent opening in order to remove the contents. The correct manner of using the closure is made clear to the user in this way, whereas the containers with which we are familiar and which lack instructions may hardly be described as being suitable for their purpose. It is possible in this way to prevent spilling of the contents.

A further provision is that the internal surface of the mouth of the container which is essentially cylindrical at the top has a shape which tapers inwards slightly and/or at the base at the point of transition to the ledge forms a snap-in groove all the way around into which a corresponding projection or bead in the lid may be snapped. In this way the sealing and retention of the lid is considerably improved by the snap-in groove and the corresponding bead in the lid when it is used for re-sealing the container. Furthermore, the insertion of the lid when it is used for re-sealing is facilitated by the slightly conical guide.

In the case of containers with a circumference which is not circular a functional embodiment may be observed, for example, in the case of a rectangular opening where the ledge with which the lid makes contact is in the form of indentations in at least two of the four lateral edges of the container. A section through one of the corners with a ledge in a rectangular container will illustrate its similarity with a round container. The replacement of the lid will be facilitated if the walls of the container are slightly inclined.

Finally, one embodiment of the lid exhibits an upward-facing raised area alongside the dishing which forms the guide, said raised area being connected to the guide or to the dishing by means of radial or tangential ribs. In this way the local force required for opening the container may be applied to the ribs. It is possible in the case of a round lid with a raised area of the indicated shape within which the ribs are located for the peripheral failure zone which is connected to the outer extremities of the ribs to be broken open by force applied in a lateral direction or by force applied in the direction of the interior of the container.

BRIEF DESCRIPTION OF THE DRAWINGS

The present invention is described in greater detail in relation to a number of figures of the annexed drawings, in which FIGS. 1–4 show a basic embodiment of the invention;

FIG. 11 is a perspective view of the container and where FIG. 12 shows the container as seen from above;

DETAILED DESCRIPTION

Figure 4:
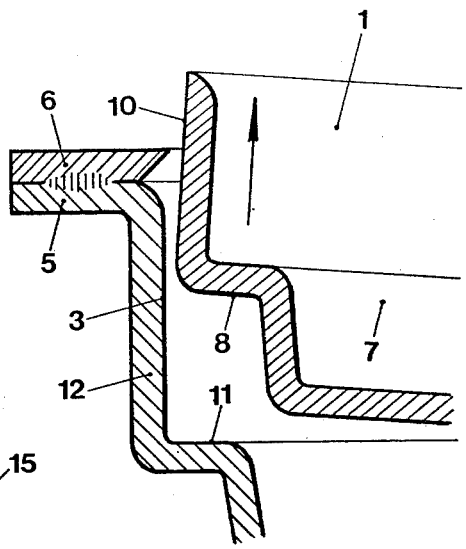

FIGS. 1–4 show a section through part of the area of the edge of a container 4 at the mouth of the container. The wall 12 of the container has at its upper part an essentially cylindrical internal surface 3, which then becomes an outward-facing flange 5, which forms the extremity of the actual body of the container at its upper part. Running parallel with the top surface which is formed by the flange 5 is a ledge 11 located at a certain distance down the wall of the container and joined to the cylindrical internal surface 3.

The Figures also show a closure 15 composed of a lid 1 and combined with the lid an external fastener 6 which runs all the way round. The junction between the lid and the fastener 6 is in the form of a failure zone 2. Located on the underside of the fastener is a welding projection 19 which runs all the way round. The lid has a downward-facing dish 7 which is joined to the fastener by means of essentially cylindrical lid components 24, which on the one hand have an essentially cylindrical external surface or guide 10 corresponding to the cylindrical internal surface 3 of the container, and on the other hand have an essentially horizontal annular surface 8 parallel with and facing the ledge 11.

FIG. 1 shows the closure 15 in the position adopted by the closure before it is attached to the body 4 of the container. In this position the welding projection 19 of the closure is in contact with the flange 5 on the body of the container. The fastener and the flange are welded together by exposure to, for instance, ultrasonic sound whilst at the same time the fastener 6 of the closure and the flange 5 are being held together under pressure.

FIG. 2 shows the position adopted by the closure after the welding process described above has been completed. FIG. 2 also shows a distance a which is the distance between the annular surface 8 of the lid and the ledge 11 inside the container.

FIG. 3 shows the position adopted by the lid 1 after an external force has been applied in a downward direction to the outermost edges of the lid, for instance to that part of the lid which is found attached to the annular surface 8. The downward force will break the joint between the lid and the fastener 6 in the failure zone 2, whereupon if force continues to be applied in a downward direction the lid will be moved over the distance a so that its annular surface 8 will come into contact with the ledge 11.

Once the lid 1 has been separated fully or partially from the fastener 6 along its circumference, it is then raised in the manner shown in FIG. 4 and the container is open. It may be seen from the Figure that the contents in the opened container are accessible without difficulty, for instance allowing portions to be removed separately, since there are no components in the area of the mouth to obstruct the removal of the contents.

To re-seal the container the lid 1 is replaced in the mouth of the container, when the guide 10 on the lid will operate in conjunction with the cylindrical internal surface 3 of the container to guide the lid into the position shown in FIG. 3. In so doing that part of the lid which is connected to the annular surface 8 will cause the guide 10 of the lid to make reliable contact with the cylindrical surface 3, at the same time as the annular surface 8 makes contact with the ledge 11. Reliable re-sealing of the container is thus made possible and any of the contents which may have become deposited on the ledge 11 will be able to flow back down into the actual container on re-sealing. Airtight re-sealing is also helped by the contact between the dishing 7 and the internal surface of the container beneath the ledge 11. In the particular case of containers designed to permit portions to be removed individually, the dishing 7 is arranged in such a way that the joint between the dishing 7 and the annular surface 8 is located slightly inside the wall of the container in order to ensure the unobstructed passage of the contents from the ledge 11 into the actual container in conjunction with re-sealing. However, where a certain amount of the contents still remain on the ledge 11, the guide 10 will ensure that the required sealing between the lid and the container is provided when the container is re-sealed.

It may also be seen from FIG. 2 that an originally sealed container is hermetically sealed, since the joint between the fastener 6 and the flange 5 prevents any passage to or from the inside of the container. Intact material is also to be found in the failure zone 2, with the result that the sealing of the container is also guaranteed in this area.

Figure 5:
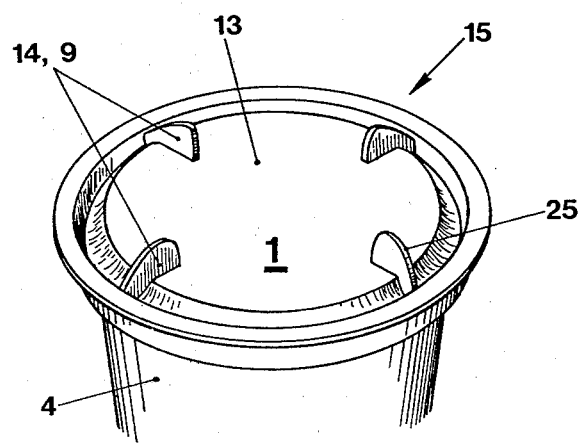
FIGS. 5–7 show an embodiment with radially located gripping devices.
Figure 6:
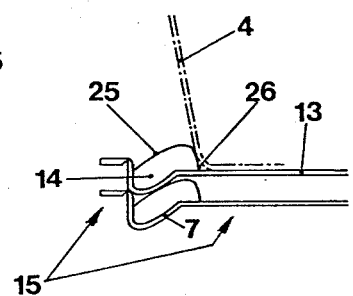
Figure 7:
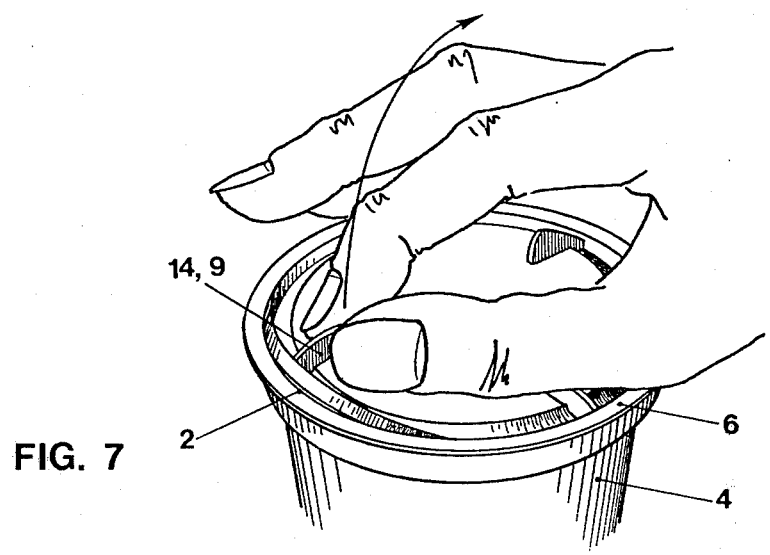

FIGS. 5–7 show how the lid 1 in the closure 15 is provided with a number of stiffening ribs 14 which are arranged radially at equal intervals around the circumference. The stiffening ribs are located between the central parts 13 of the top of the lid and the annular failure zone. FIG. 7 in particular shows how the stiffening ribs 14 may be used as gripping devices 9 for use when opening the container.

FIG. 6 shows how the stiffening ribs 14 have an upper edge 25 which faces outwards and downwards and which fits into the dishing 7 on the lid in such a way that the edge will serve as a stacking device when a number of closures are piled one on top of the other. FIG. 6 also shows how the stiffening ribs 14 have an inwards and downwards facing edge 26 which fits into the shape of the base of the container 4 in such a way that the stiffening ribs 14 constitute a stacking device which provides stability and location when filled containers are piled one on top of the other.

Figure 8:
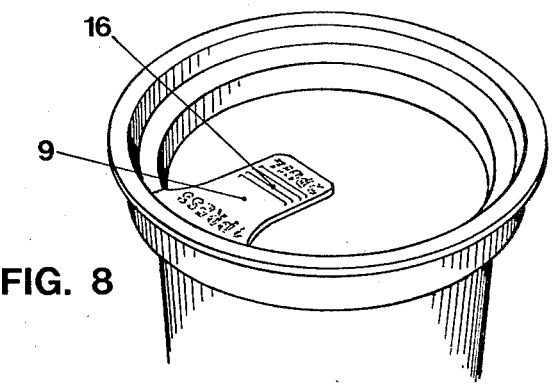
FIG. 8 shows an embodiment with a combined gripping device and operating instructions.

FIG. 8 shows an embodiment in which the gripping device 9 is provided with a gripping surface 16 which is made rough by means of ribbing and which bears operating instructions which consist for example of the text "1. PRESS" for starting the opening and "2. PULL" for continuing the opening of the container.

Figure 9:
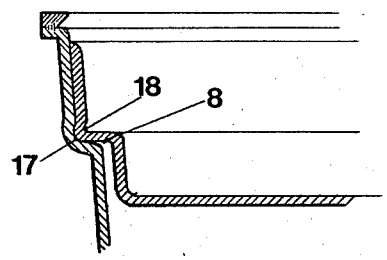
FIG. 9 shows an embodiment with a snap-in groove.

FIG. 9 shows how the lid is designed with a bead 18 and the container is designed with a snap-in groove 17. When the container is re-sealed the bead 18 snaps into the groove 17 and improves the re-sealing characteristics.

Figure 10:
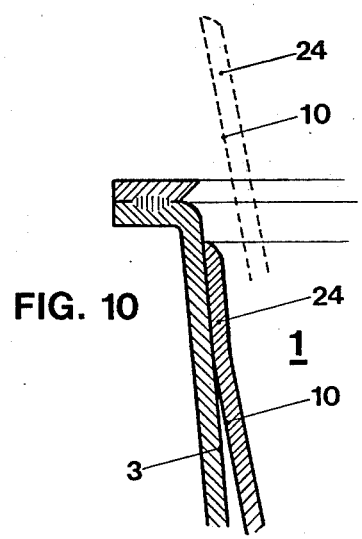
FIG. 10 shows an embodiment with differing tapers on the lid and on the surface of the opening.

FIG. 10 shows an embodiment in which the guide 10 of the lid 1 tapers rather more than the internal surface 3. The shape of the lid before it is inserted into the mouth is shown with broken lines and the shape after it has been inserted is shown with solid lines. In the case of a container which has been re-sealed, this difference in taper places a certain amount of tension on those part 24 of the lid which support the guide in order to im prove the retention and sealing of the lid against the mouth of the container after re-sealing. The elasticity of the material also causes the guide 10 to make contact with the cylindrical internal surface 3 of the mouth over a reassuringly large contact area after the container has been re-sealed.

Figure 11:
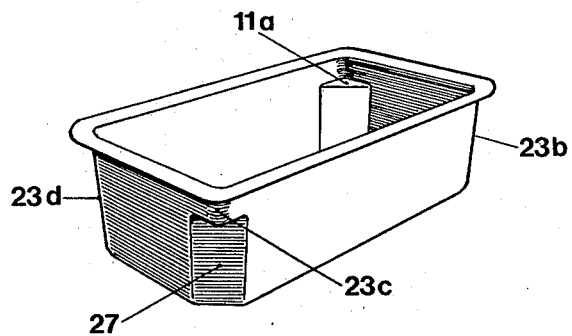
FIGS. 11–12 show an embodiment with a rectangular opening, where
Figure 12:
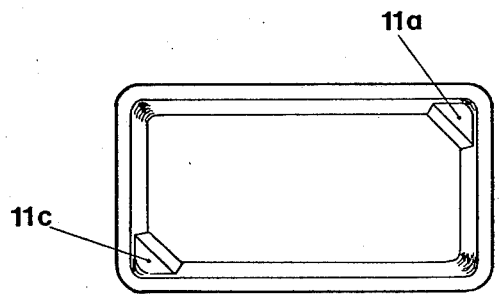
Figure 13:
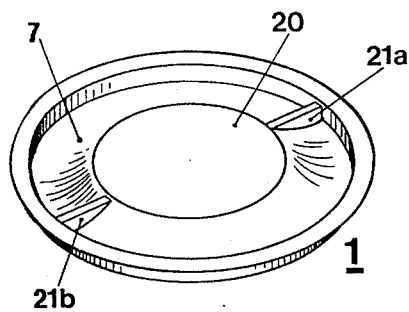
FIGS. 13–17 shows embodiments in which the lid has an upward-facing raised area at the centre connected to the edges of the lid by means of radial or tangential ribs.

FIGS. 11–12 show an embodiment of the invention in which the opening at the mouth is rectangular in form. The ledges 11 are in the form of indentations 27 in at least two of the four lateral edges 23 of the container. The stacking of both empty and filled containers on top of each other is facilitated by designing the walls of the container and the indentations so that they are slightly conical in shape.

FIGS. 13–17 show embodiments in which the lid has an upward-facing raised area 20 alongside the dishing 7 which forms the guide 10. The raised area is connected to the guide or the dishing by means of radial 21 or tangential 22 ribs.

Figure 14A:
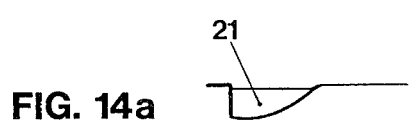
Figure 14B:
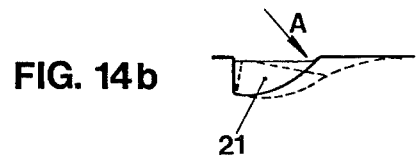
Figure 15:
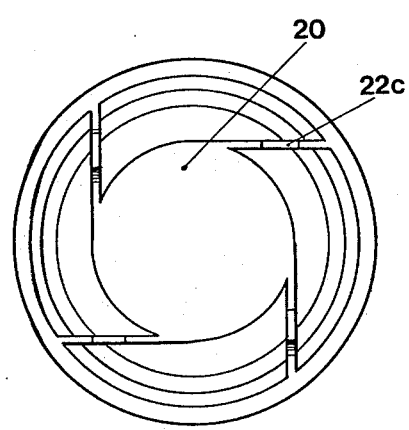

FIGS. 14a–b shows details of a rib 21 and its function in conjunction with the opening of an originally sealed container. The solid lines in the Figures show the position of the ribs at rest, whilst the broken lines show the position of the ribs in their functional position. When a force is applied as shown in FIG. 14b to the upper part of the rib (indicated by the arrow A), both the rib and the adjacent parts of the lid will be pressed downwards at the same time as the joint between the lid and the closure will be broken at the failure zone. Once the joint has been broken, the rib 21 will form a gripping device for use in lifting the lid from the mouth of the container.

Figure 16:
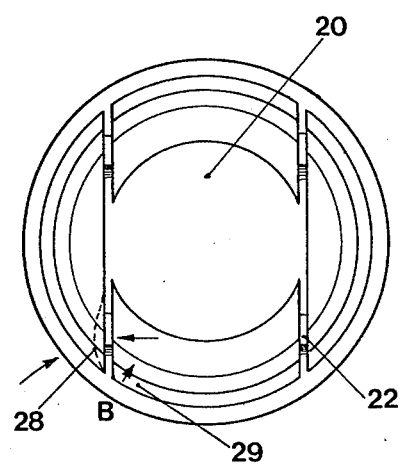

FIG. 16 shows how the application of horizontal force to a tangential rib 22 will cause the rib and the adjacent parts 28 of the lid to move in the direction of the failure zone of the closure at the same time as other adjacent parts 29 will be caused to move away from the failure zone, thereby causing the joint with the failure zone to be broken. The two opposing arrows show how the force is applied, whilst the third arrow B shows the direction in which the parts of the material will move away from the failure zone. It is also possible, of course, to design an originally sealed container in such a way that it is broken open initially by the application of compressive force towards the interior of the container in the manner which has already been described.

Figure 17:
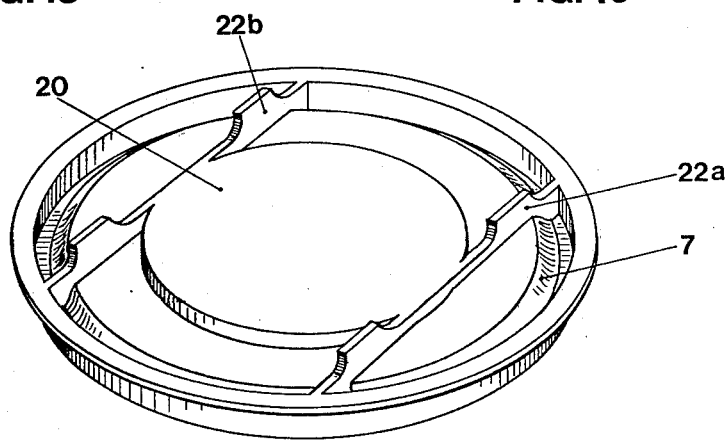

FIG. 17 shows how the tangential ribs 22 are designed so as to fit the underside of the dishing 7 when closures are stacked one on top of the other.

Provision is also made for a preferred embodiment incorporating all the above embodiments in which the internal surface of the opening of the container is slightly tapered towards the centre. The corresponding parts of the lid are similar in form in this case.

The Figures also show the failure zone designed as a groove facing inwards from the upper surface of the closure. In an alternative embodiment the groove is similarly formed in the internal surface of the closure or in both the inner and outer surfaces of the closure.

The assumption is made in the above description, which consists only of typical embodiments within the idea of invention, that the attachment of the closure to the flange of the container is achieved by means of welding, and preferably by means of ultrasonic welding. It is clear that similarly acceptable characteristics may be achieved in a container if the attachment of the closure to the container is done by some other means which will produce a joint of similar reliability. An example of such a joint is the use of the process known as "hot melt."

The embodiments indicated and described above are nothing more than typical applications of the idea of invention. It is clear that other embodiments are also possible within the idea of invention.

I claim:

1. In a container (4) with an opening facing upwards in the top surface and with a closure (15) for said opening consisting of a fastener (6) and a lid (1) which are joined together all the way round by a failure zone (2), said closure being inserted into the opening and forming a seal with the container, and in which the lid is broken open and is torn along the failure zone by a locally applied force, preferably under pressure, whereby force applied in an inward direction will cause the lid to move inwards to a point at which, having moved over a distance a, it will on the one hand make contact with a surface (8) located on the lid running parallel with the top surface, and will on the other hand make any further opening difficult, and in which the lid is also provided with a gripping device for removing the fully or partly loosened lid, the improvement wherein the failure zone (2) of the lid (1) is located at the point at which the internal surface (3) of the opening meets the top surface of the opening, whereby a flange (5) on the container (4) is bonded to the attachment ring (6) of the closure (15), the lid (1) within the failure zone (2) on the other hand supporting the gripping device (9) with which the container is opened, and on the other hand is dished inwards in such a way that the dishing (7) at its outer edge forms a guide (10) against the essentially cylindrical internal surface (3), whereby the surface (8) parallel with the top surface is connected to the guide (10), said surface (8) after the lid (1) has been torn open and if applicable after the lid has moved inwards over the distance a making contact with a ledge (11) located inside the container (4) and forcing the guide (10) against the wall of the container (12).

2. A container in accordance with claim 1, wherein between the central parts (13) of the lid and the annular failure zone (2) are located a number of radial stiffening ribs (14) arranged uniformly around the circumference, which are so designed as to serve both as gripping devices (9) for opening the lid and as a stacking device for a pile of filled containers or of loose closures (15).

3. A container in accordance with claim 1, comprising a single gripping device (9) with operating instructions is located adjacent to a gripping surface (16), said instructions consisting of the text: "1. PRESS" for starting the opening process in the failure zone and "2. PULL" for continuing the opening process on first opening the container or on any subsequent opening of the container in order to remove the contents.

4. A container in accordance with claim 1, 2 or 3 wherein, the essentially vertical internal surface (3) at the mouth of the container is slightly inclined towards the central axis of the container.

5. A container in accordance with claim 1, 2 or 3 wherein, the essentially vertical internal surface (3) at the mouth of the container forms a snap-in groove (17) into which a bead (18) in the lid may be snapped, all the way round at the base of the vertical internal surface adjacent to the point of transition to the ledge (11).

6. A container in accordance with claim 1, 2 or 3 wherein, with the lid (1) removed from the mouth of the container the guide (10) has a greater taper than the internal surface (3) of the mouth, the dimensions and material of the lid being chosen in such a way that with the container re-sealed the internal surface (3) of the mouth of the container forces at least those parts of the guide (10) closest to the edge of the mouth towards the centre of the container so as to improve the retention and sealing of lid against the internal surface (3).

7. A container in accordance with claim 1, 2 or 3 wherein, the top opening is perpendicular and the ledge (11) with which the lid (1) makes contact is in the form of indentations in at least two of the four in the main vertical lateral edges (23) of the container.

8. A container in accordance with claim 1, 2 or 3 wherein the lid (1) has an upward-facing raised area (20) alongside the dishing (7) which forms the guide (10), said raised area (20) being connected to the guide (10) or to the dishing (7) by means of radial (21) or tangential (22) ribs (21,22) whereby the local force required for opening the container may be applied to the ribs (21,22).

* * * * *